May 19, 1964

D. D. DOUGLAS 3,133,322

WALL PANELS FOR PREFABRICATED BUILDINGS AND COUPLING
JOINTS AND ANCHORING MEANS THEREFOR

Filed Feb. 26, 1960

May 19, 1964          D. D. DOUGLAS          3,133,322
WALL PANELS FOR PREFABRICATED BUILDINGS AND COUPLING
JOINTS AND ANCHORING MEANS THEREFOR
Filed Feb. 26, 1960          4 Sheets-Sheet 4

United States Patent Office 3,133,322
Patented May 19, 1964

3,133,322
WALL PANELS FOR PREFABRICATED BUILDINGS AND COUPLING JOINTS AND ANCHORING MEANS THEREFOR
David D. Douglas, Huntington, N.Y.
(Black Hall Road, Epsom, N.H.)
Filed Feb. 26, 1960, Ser. No. 11,347
5 Claims. (Cl. 20—4)

The present invention relates to wall panels for advantageous use in the construction of prefabricated buildings, coupling joint structures to connect adjacent pairs of these panels together and means for anchorage thereof to adjacent structures.

An object of the present invention is to provide such wall panels, coupling joints and anchoring means which may be effectively used to advantage with floor and roof panel units of my copending application Serial No. 859,916, filed December 16, 1959, Patent No. 3,082,489, for Building Panels For and Coupling Joints Therebetween in Prefabricated Buildings, in the rapid and economical erection of sturdy prefabricated buildings while permitting ready demountation for rearrangement of such buildings.

Another object of the invention is to provide such wall panels and coupling joints therebetween characterized by simple, easily assembled elements requiring no particular skill for mounting of the parts and only a few simple tools, and which following assembly into wall areas will provide desirable concealed ways for plumbing and electrical wiring while allowing ready access to the latter when required.

A further object of the invention is to provide simple means for anchoring headings or top ends of such wall panels rapidly to overhead structure, such as ceiling or roof constructions, in a manner to permit the wall panels effectively to carry load imposed by the latter.

A still further object of the invention is to provide structural embodiments thereof which are readily constructed by mass production procedures which permit efficient use and operation thereof.

Other objects of the invention will in part be obvious and will in part appear hereinafter.

The invention accordingly comprises the features of construction, combinations of elements, and arrangement of parts, which will be exemplified in the constructions hereinafter set forth, and the scope of the invention will be indicated in the claims.

For a fuller understanding of the nature and objects of the invention reference should be had to the following detailed description taken in connection with the accompanying drawings, in which.

Figure 11:
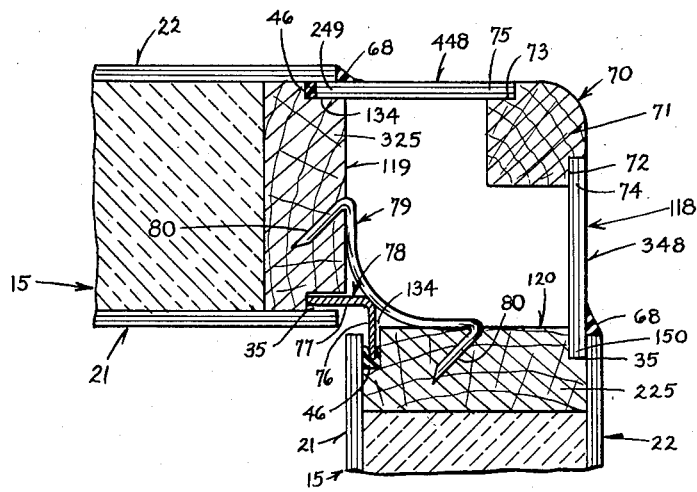
Figure 12:
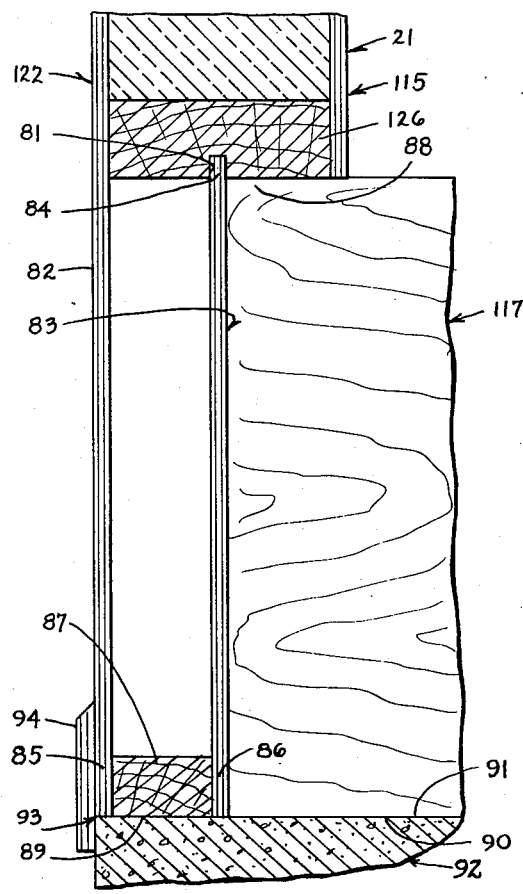

FIG. 11 is a transverse section, with parts broken away, of a corner coupling joint structure, illustrating means suitable for connecting adjacent wall panel units of the present invention together in an L joint; and FIG. 12 is a vertical sectional detail, with parts broken away, of a modified bottom portion of an outside wall embodiment of the wall panel of the present invention, illustrating coverage and concealment thereby of the edge of floor slab means on which it is seated.

Referring to the drawings, in which like numerals identify similar parts throughout, it will be seen that an embodiment of the invention comprises a plurality of companion building wall panels 15—15, each juxtaposed pair of which is demountably connected together by coupling joint structure 16. One embodiment of this invention is illustrated in FIGS. 1 to 8 incl.

Figure 1:
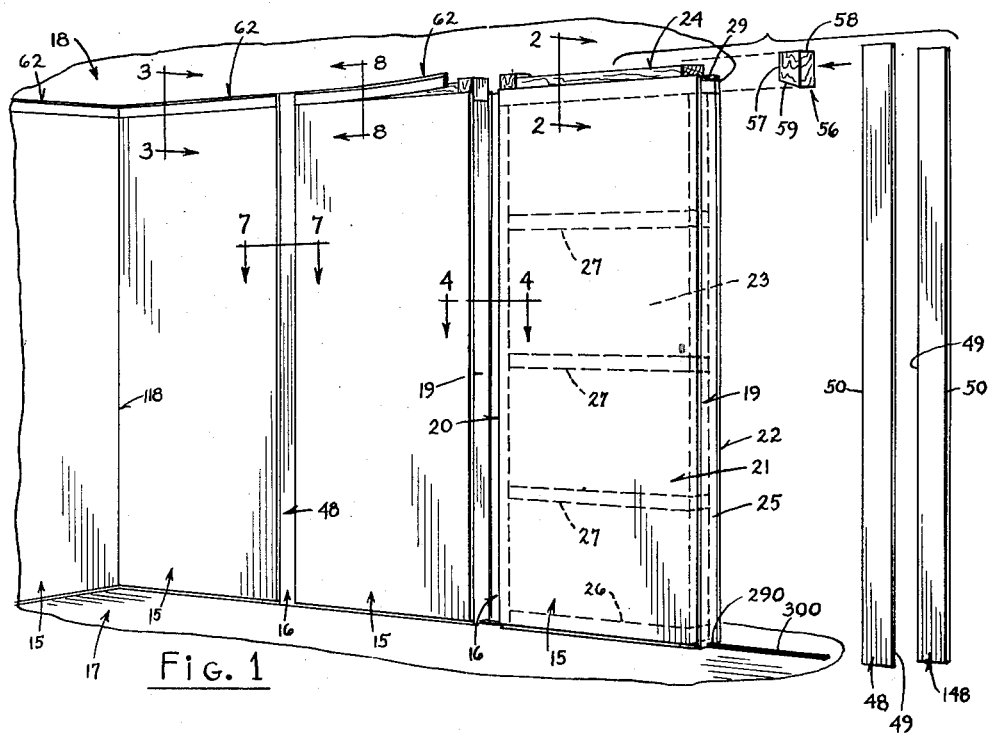
FIG. 1 is an exploded perspective view of sections of a building or room wall constructed from wall panels of the present invention, employing coupling joint means thereof to connect adjacent panels together, and illustrating means of the invention to anchor the headings thereof to overhead structure, such as a roof or ceiling area.

Referring to FIG. 1 to 8 incl. it will be seen that such wall panels 15—15 and coupling joint structures 16—16 may be employed to define between an area 17 of suitable floor structure and an area 18 of horizontal overhead structure side walls of a room or outer walls of the building. Let it be assumed that in the perspective view of FIG. 1 is illustrated portions of the side walls of a room erected upon any suitable floor structure 17, which may be of concrete slab construction or built by assembly of the panel units of my copending application Serial No. 859,916, identified above. The horizontal overhead structure 18 may be the roof of the building with some load thereof to be borne by the assembled wall panels in both the partition and outer walls. While the coupling joint structure 16 is employed between juxtaposed side edges of each pair of aligned adjacent wall panels 15, 15, it will be understood that for a corner coupling structure, such as is required at 118 in FIG. 1, various means may be employed to effect the right angular connection, one such means being illustrated in FIG. 11 described hereinafter.

Figure 2:
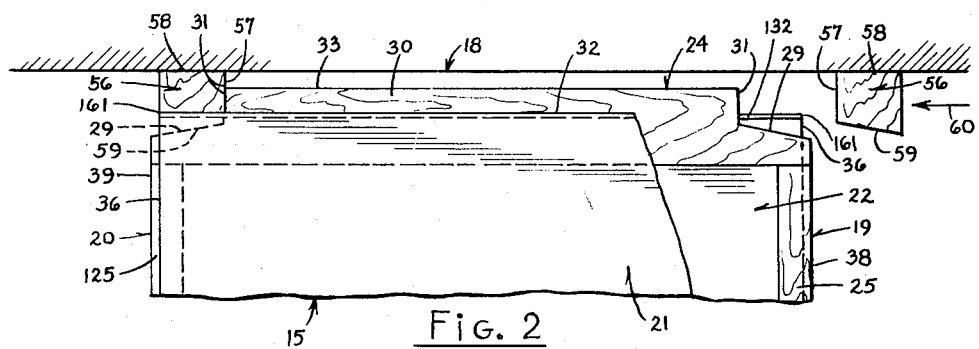
FIG. 2 is an enlarged front elevational view, with parts broken away and in section, of the top end or heading of one of the panels shown in FIG. 1 as viewed from line 2—2 thereof, illustrating the mode of anchoring it to transverse overhead structure, such as a roof or ceiling area.

As will be understood from FIGS. 1 and 2, each wall panel 15 is rectangular, having opposite vertical side edges 19 and 20, each of which may be about seven feet ten and one-half inches (7'10½") long and about four inches (4") wide. Each rectangular wall panel 15 thus has appreciable transverse thickness and is provided with two outer facing zones 21 and 22. For this purpose, each rectangular wall panel 15 preferably includes core means 23 comprising a framework which may have a horizontal head board 24 with its ends mounted upon and suitably fastened to the top ends of a pair of laterally-spaced vertical side rails 25 and 125, between the bottom ends of which is connected or fastened a lateral bottom core rail 26. Within the resulting rectangular frame preferably are provided a plurality of lateral cross rails 27—27 having their ends suitably fastened or connected to the vertical side rails 25 and 125. The two outer facing zones 21 and 22 in such wall panel embodiment may then be in the form of skin or sheathing sheets, such as layers of plywood, fiber board or other suitable and desired facing material. If, for example, such a wall panel construction is designed to be employed in the erection of an outer wall of a building it may be faced on the side intended to be the inner room side thereof with decorative plywood and on the side intended to be the outer side of the building wall with weather-resistant sheet material or metal, such as sheet aluminum or asbestos board, or any other durable sheet material which will weather well. The chambers defined in the core means framework 23 between the sheathing sheets 21 and 22, head board 24 bottom rail 26 and intervening cross rails 27—27 may be filled with any suitable sound-deadening and heat-insulating material, such as that diagrammitically ilustrated at 28 in FIGS. 4 to 8 inclusively.

The bottom rail 26 and the bottom ends of the vertical side rails 25 and 125 may, if desired, be provided with aligned lateral grooves on the undersides thereof to form a channel 290 into which may fit a suitable strip 300 fastened to the top surface of the floor area 17 to dictate the positions of the bottom ends of the wall panels 15—15 and securely to hold them in their intended locations. Other means, such as U-shaped channels to receive the bottom ends of the panels 15—15 may be employed for this purpose.

The heading or top end of each rectangular wall panel 15 includes the lateral head board 24 and the end portions of the two skin or sheathing sheets 21 and 22. It will best be seen from FIGS. 2, 3, and 8 that each end of the head board 24 is notched on the top corner thereof to provide an oblique wedging surface 29 intervened by an upwardly projecting portion 30 having end abutment surfaces 31, 31. The horizontal top edges at 32 and 132 of skin or sheathing sheets 21 and 22 in the heading or top portion of each rectangular wall panel 15 lap against the sides of the head board 24 appreciably below the top edge 33 of the intervening portion 30 and with each shaped to define a horizontal top groove. For the latter purpose, the top edges of the skin sheets 21 and 22 are chamfered or mitered to extend obliquely downwardly toward the opposite side faces of the head board 24, as shown at locations 32 and 132 in FIG. 8, so that they together define V-shaped horizontal grooves thereat for a purpose to be explained later.

In the illustrated embodiments, the vertical panel side edges 19 and 20, consisting in part of the vertical side rails 25 and 125, are provided with two longitudinally-extending channels 34 and 35 spaced appreciably transversely of these panel side edges, with those in one panel edge being substantially aligned with those in the other opposed panel edge to form two opposed pairs thereof 34, 35 and 34, 35. It will be seen from FIGS. 2 to 7 incl. that in the embodiment illustrated therein the side edges 36 and 37 of the skin sheets 21 and 22 extend laterally short of the side edge faces 38 and 39 of the vertical side rails 19 and 20, and this set back may be of the order of about one-sixteenth of an inch (1/16"). Thus the lateral spacing, indicated at (A) in FIG. 4, between the side rail faces 38 and 39 is less than the lateral spacing (B) between the edges 36 and 37 of the opposed and aligned skin sheets 21, 21 or 22, 22. The lateral spacing (A) may, if desired, be about equal to the transverse overall thickness of each wall panel 15.

Figure 4:
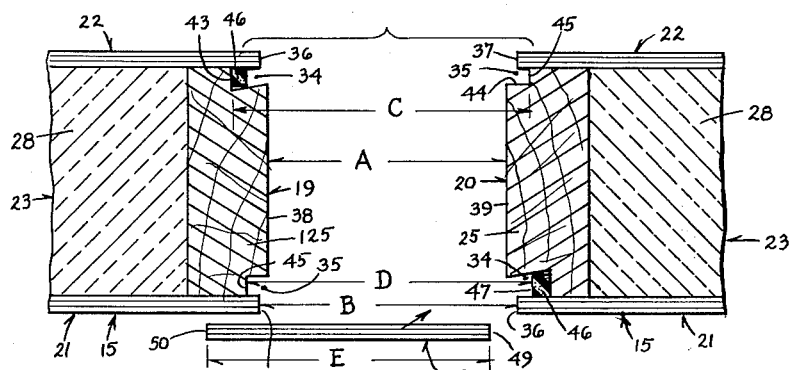
FIGS. 4, 5 and 6 are similar enlarged transverse sections, with parts broken away, taken substantially at line 4—4 of FIG. 1, of juxtaposed side edges of a pair of the wall panels, illustrating progressively an initial step of assembling therewith an element of coupling joint means.
Figure 5:
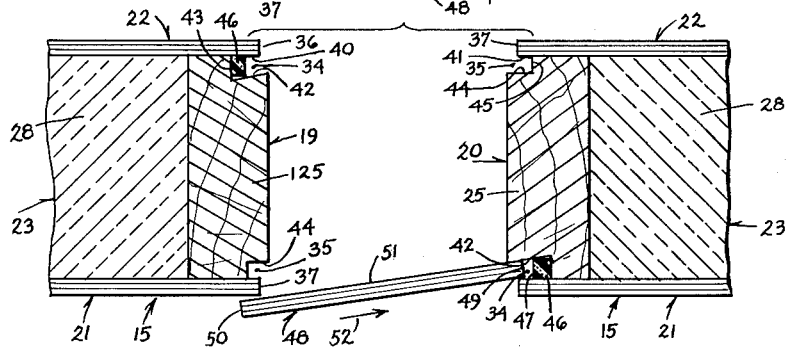

It will also be noted from FIG. 5 that the inside face 40 of skin sheet 22 adjacent its side edge 36 defines the outer side face of channel 34 and that the inside face 41 of skin sheet 22 adjacent its side edge 37 defines the outer side face of channel 35. Opposed to the outer side face 40 of each channel 34 the latter is defined by an inner side oblique face 42 so that the latter, at its bottom 43, is wider than its mouth, as will be noted from FIGS. 4 to 7 incl., for a purpose to be explained in connection with FIGS. 5 and 6. Each channel 35 has an inner side face 44 which may be substantially parallel to its outer side face 41, so that this channel is substantially as wide at its mouth as it is at its bottom 45. Each opposed pair of aligned, laterally-spaced channels 34, 35 have their transverse bottoms 43 and 45 spaced apart laterally a distance (C) which is greater than the spacings (A) and (B). In the bottom of each throated channel 34 is provided elongated strip means 46 of compressible elastic material, such as sponge rubber, and due to the fact that the mouth of this channel is narrower than it is at the bottom, such elastic strip means will be held securely in position therein without tendency to be lost during shipping or handling of the wall panel when such strip is wider initially than the mouth of the channel, requiring slight transverse compression for insertion. Elastic strip means 46 may be in the form of a continuous strip or spaced sections of such a continuous strip. It has been found that short sections spaced about twelve inches (12") on center serve very well the intended purpose. Also bowed resilient metal spring strips or clips may be employed for the same purpose if it is not desired to take advantage of the packing effect of strips of elastic material. All such means provide resilient biasing means in the bottoms of channels 34. The distance (D) between the bottom 45 of channel 35 in each aligned pair of channels 34 and 35 in the outer side face 47 of the elastic strip means 46 seated and the bottom of channel 34 of this aligned pair is appreciably less than the lateral spacing (C) between the bottoms of these channels, but appreciably greater than the lateral spacings (A) and (B).

Figure 6:
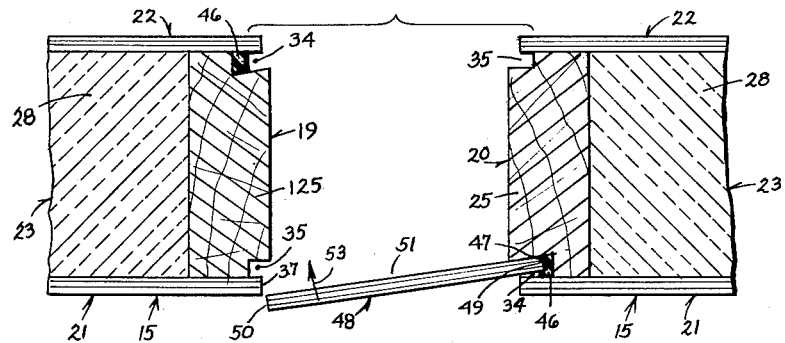
Figure 7:
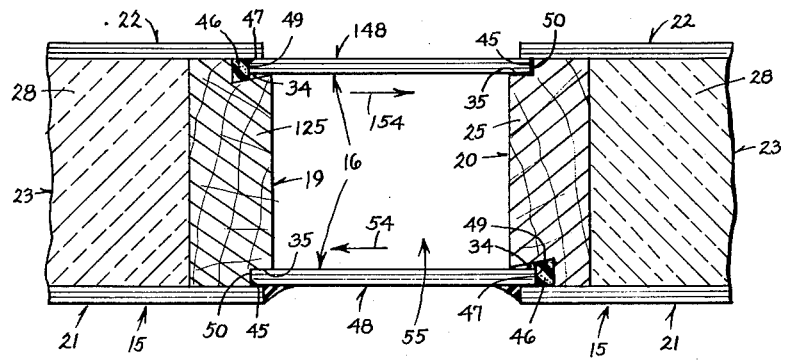
FIG. 7 is a transverse section, with parts broken away, taken substantially on line 7—7 of FIG. 1, similar to FIGS. 4, 5 and 6, showing the completion of the mounting of the element illustrated in the latter figures and the completed mount of the companion element of the joint structure in like fashion.

Each coupling joint structure 16 includes a pair of vertical battens 48 and 148, each having opposite side edges 49 and 50 spaced laterally a distance (E) which, as will be seen from FIG. 4, is greater than the lateral spacings (A), (B) and (D) and less than the lateral spacing (C). Such vertical batten strip may be made of sheet material similar to that employed for the skin sheets 21—21 and 22—22. FIGS. 5, 6 and 7 illustrate the procedure of mounting batten strip 48 into the aligned pair of channels 34 and 35 adjacent the skin sheets 21, 21 of the companion pair of wall panels 15, 15. As is indicated in FIG. 5, the side edge 49 of batten strip 48 will be swung inward to behind the side edge flange 36 of skin sheet 21 adjacent which is located channel 34 carrying elastic strip means 46. In such position the other edge 50 of batten 48 will be lapping against the outer side of edge flange 37 of skin sheet 21 adjacent the channel 35 in the opposed wall panel 15. The obliquely arranged batten 48 will then be moved laterally in the plane of its back face 51, in the direction of the arrow 52 in FIG. 5, with this back face sliding along the oblique inner side face 42 of channel 34 until its side edge 49 is brought to abutment of the outer face 47 of elastic strip means 46. Upon further motion of batten 48 in its plane in this same direction, the side edge 49 thereof compresses the elastic strip means 46 sufficiently to permit the other side edge 50 to pass beyond the side edge flange 37 of the panel skin sheet 21, as is indicated in FIG. 6. Then this latter batten side edge 50 will be swung back in the direction of the arrow 53 of FIG. 6 until it is aligned with the channel 35, so that when the batten is released the compressed elastic strip means 46 will expand to push the batten back in its plane, in the direction of the arrow 54 in FIG. 7, so that the side edge 50 is securely seated in channel 35 and snugly abutted against the bottom 50 of the latter, as will be seen in the lower portion of FIG. 7.

Since the companion batten 148 is like or similar and the other pair of opposed channels 34 and 35 on the far side of the companion pair of wall panels 21, 21 are like the previously described pair, but arranged in reverse order, the mounting of this second batten will be accomplished in similar manner so as to produce the completed coupling joint structure 16 of FIG. 7. As a result, the opposed side edges 19 and 20 of the companion pair of wall panels 21, 21, which are spaced laterally an appreciable distance (A) and the two transversely-spaced, vertical battens 48 and 148, which are transversely spaced an appreciable distance, together define a vertical enclosed passage 55 of appreciable cross-section in which plumbing and electrical wiring may be installed.

It will be understood that the companion panels 15, 15 which are connected together by the coupling joint structure 16 are readily dismounted from each other by removing the battens 48 and 148 in a manner just the reverse of that described above for the mounting thereof. For example, batten 48 will be demounted by pushing it laterally in a direction opposite to that indicated by the arrow 54 in FIG. 7 so as to cause its side edge 49 to compress the elastic strip means 46 to the extent indicated in FIG. 6. Thus the other side edge 50 of batten 48 will be freed from channel 35 and may then be swung outwardly from behind the side edge flange 37 back to the position of FIG. 6, permitting the withdrawal of side edge 49 from the channel 34 in a direction opposite to that indicated by the arrow 52 in FIG. 5. Removal of the remaining batten 148 is accomplished in like manner. Upon releasing such decoupled wall panels from anchorages at the supporting floor structure and the overhead structure, such as floor area 17 and ceiling area 18, they may be removed for mounting at different locations in altering or redesigning the space enclosed thereby.

In erecting each successive wall panel 15 it is a simple matter to place the bottom end thereof over the aligning and anchoring strip 300 secured on the floor surface 17, with this strip received in the bottom edge groove 290. When the heading or top end of this wall panel 15 is located beneath the horizontal overhead structure or ceiling area 18, it will be demountably wedged into position with proper attention to plumb orientation thereof. The wedging anchorage is accomplished with the use of a pair of like wedging blocks 56, 56, each having a vertical end surface 57, a flat top surface 58 and an oblique bottom surface 59. The oblique bottom surface 59 of one of the wedge blocks 56 is seated upon the oblique wedging surface 29 of the head board 24 at one end of the latter and the block is driven in laterally, in the direction of the arrow 60 in FIG. 2, between the upstanding, transversely-spaced flanges formed by the corners 61, 161 of the top edges at 32 and 132 of the inner side and outer side skin sheets 21 and 22 which extend above the wedging oblique surface of this particular end of the head board. When the wedging block 56 is driven home to seat its inner end 57 against the vertical end surface 31 adjacent the oblique wedging surface 29 of the head board 24, the top surface 58 of the block will be wedged upwardly into firm contact with the horizontal overhead structure or ceiling surface 18. As a result, the top end of the wall panel 15 will be securely anchored in proper position to the horizontal overhead structure of ceiling surface 18 and in load bearing relation thereto, as will be understood from FIGS. 3 and 8. Consequently, each wall panel 15, when so anchored in position in this fashion, effectively will bear overhead load imposed thereon through the wedge blocks 56, 56, as is suggested by the broken line arrows 156, 156 in FIG. 3. In changing the positions of wall panels 15—15 for alterations of rooms or building walls, one simply drives the wedging blocks 56, 56 laterally outward from above the core means or frame structure of the wall panel to free its top end from anchorage to the ceiling area 18, after which it may be easily moved to a new position.

When the overhead structure 18 is the roof of a low building its load which is imposed upon the walls constructed from assembled wall panels of the present invention, such as 15—15, may be so light in weight as to fail to assure that it will remain in the proper position when the wedge blocks 56, 56 are driven in above the top ends of all of the wall panels. This assurance may be obtained by suitably tying the overhead structure 18 to the top ends of the wall panels, 15—15. If, for example, the overhead structure 18 be a roof construction made up of a plurality of panel units assembled together, with the latter having sheathing or skin sheets the bottom one of which provides the underface, this bottom sheathing sheet of each panel unit which may be superposed on the top edge of one or more of the vertical wall panels may be securely anchored to the latter by a plurality of long lag bolts. Such lag bolts, indicated at 256, 256 in FIG. 3, may each have a head (not shown) located to the top side of such bottom sheathing sheet, and the shank of each may extend down through aligned holes in this bottom sheathing sheet, wedge block 56 and the underlying end of head board 24, into the top end of vertical side rail 19 (or 20) therebeneath.

The portion 30 of the head board 24 which projects above the shaped top edges at 32 and 132 of the sheathing or skin sheets 21 and 22 of each wall panel 15, and wedging blocks 56, 56, are desirably masked or covered by horizontal masking battens 62, 62. Each horizontal masking batten 62 is in the form of a strip having a lower shaped edge 63 of a configuration complementary to the groove defined by the oblique transverse surfaces at 32 and 132 of the top edges of the sheathing or skin sheets 21 and 22 and the outside vertical faces thereadjacent of the top projecting portion 30 of the head board 24. Thus the lower edge 63 of each masking batten 62 is wedge-shaped as will be understood from FIG. 8. In order that each masking batten 62 may be easily mounted and demounted while being securely wedged into anchored position, illustrated in the right side of FIG. 8, a marginal zone adjacent either the wedge-shaped or tapered bottom edge 63 thereof or that adjacent its top edge 64 will be provided in the form of a strip of compressible elastic material, e.g., sponge rubber. Preferably the marginal zone adjacent the top edge 64 of each masking batten 62 is in the form of such a compressible elastic strip 65 of sponge rubber, or the like, suitably secured to the remaining rigid body portion of the masking batten, such as by a strong bonding cement.

Figure 3:
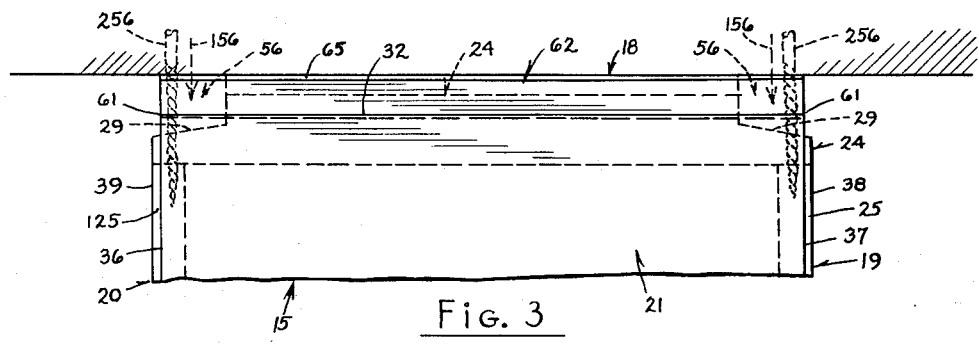
FIG. 3 is a view similar to FIG. 2 showing the parts thereof in their relative assembled conditions, and illustrating the load bearing capabilities of the mounted wall panel.
Figure 8:
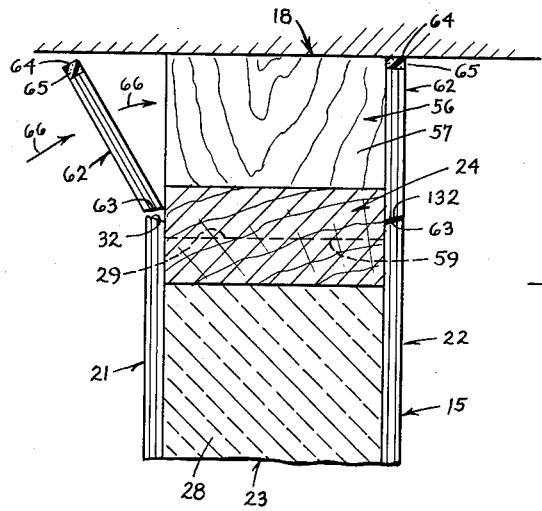
FIG. 8 is an enlarged vertical section, with parts broken away, taken substantially on line 8—8 of FIG. 1, illustrating the mount of facing battens to conceal the anchorage of the panel top end or heading.

As is illustrated in FIG. 8, each horizontal masking batten 62 is easily mounted to its masking position by inserting its tapered or wedge-shaped bottom edge 63 into the groove defined by the oblique top edge at 32 or 132 of the sheathing or skin sheet 21 or 22 and adjacent vertical side faces. Then the batten is swung back in the direction of the arrows 66, as is illustrated in the left side of FIG. 8, to abutment of the aligned side faces of the top portion 30 of the head board 24 and the positioned wedge blocks 56, 56, as is illustrated in the right side of FIG. 8. In swinging each masking batten 62 to its intended seating position, the strip 65 of compressible elastic material is compressed since the width of the batten between its bottom and top edges 63 and 64 is greater than the distance between the top edge at 32 or 132 and the horizontal overhead structure or ceiling surface 18, thereby securely wedging the masking batten in its seated position. This assembled structure is illustrated in FIG. 3 and in portions of FIG. 1. A reverse procedure of mounting each masking batten 62 into position may be practiced to advantage. The top edge 64 of the masking batten may first be abutted up against the underface of the overhead structure 18 adjacent the side faces of wedge blocks 56, 56. The batten 62 may then be lifted with compression of the elastic strip 65 sufficiently to permit the depending inner side ridge of the wedge-shaped bottom edge 63 to pass up over the upstanding outer side ridge of the oblique top edge at 32 (or at 132, as the case may be) of the sheathing or skin sheet 21 (or 22). Then, upon release of the batten 62 its elastic strip 65 will expand to force or snap the oblique wedge-shaped bottom edge 63 snugly down into the groove defined by oblique top edge at 32 (or at 132) and adjacent vertical side faces for securement of the batten in its mounted position. This latter procedure avoids the possibility of the elastic strip being distorted by lateral drag against the underface of the overhead structure when the masking batten is inserted in the manner proposed in FIG. 8.

It is suggested in FIG. 1 that the vertical battens 48 and 148 be of a length substantially to reach from the floor surface 17 to the horizontal overhead surface or ceiling area 18. It is also suggested in FIGS. 1 and 3 that each horizontal masking batten be of a length substantially equal to the width of each of the sheathing or skin sheets 21 and 22, with the gap between ends of these masking battens for adjacent wall panels 15, 15 being filled in by the top ends of the extended vertical battens 48 and 148. However, it will be understood that it may be desired to have the masking battens 62—62 longer so that ends thereof may abut in overlapping relation to the top end of the vertical batten located therebehind so as to form a continuous horizontal trim strip along the top of the assembled wall construction.

Figure 9:
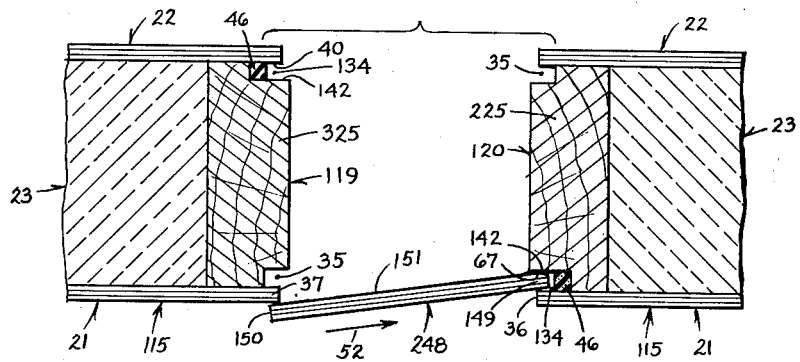
FIG. 9 is a sectional view similar to FIG. 5 illustrating the mounting of an element of a panel coupling joint of modified form.
Figure 10:
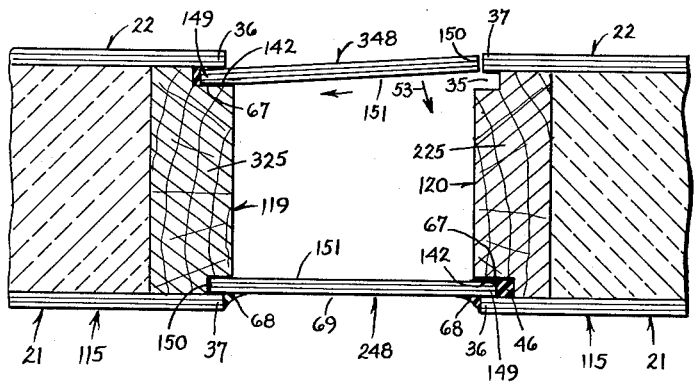
FIG. 10 is a sectional view similar to FIG. 9, illustrating the completion of the modified form of coupling joint.

In the embodiment of FIGS. 9 and 10 all of the elements of the opposed pair of wall panels 115, 115 may be like those of the opposed pair of wall panels 15, 15 of the FIGS. 4 to 7 incl. embodiment, except that the opposed laterally-spaced vertical rails 225 and 325 constituting parts of the opposed side edges 119 and 120 of the wall panels are modified with respect to the notch in which the compressible elastic strip means 46 is received. As in the preceding embodiment, the opposed pair of vertical rails 225 and 325 are similar in reverse order and each has a channel 35 which in one is adjacent to the sheathing or skin sheet 21 and in the other adjacent to the sheathing or skin sheet 22. The channels 134, 134 which are aligned and paired with the channels 35, 35 are modified in shape so that the inner face 142 of each is substantially parallel to the outer face 49 thereof. In order to permit the swinging mounting and demounting of the vertical batten strips into and out of the aligned pairs of channels 35, 134 and 35, 134 one edge 149 of each batten 248 and 348 is shaped or chamfered to provide an oblique surface 67 on the rear face thereof which is angularly related to the major back face 151 of the batten, so that this edge is wedge-shaped or tapered.

In the embodiment of FIGS. 9 and 10, batten 248 may be readily mounted in the opposed pair of aligned channels 35, 134 adjacent the back faces of the sheathing or skin sheets 21, 21 by inserting the wedge-shaped edge 149 behind the skin sheet edge flange 36 into the channel 134, with the oblique rear face 67 of the batten sliding along the flat inner face 142 of the channel to contact of the elastic strip means 46 by this edge of the batten. Upon further lateral movement of batten 248 in the direction of the arrow 52 of FIG. 9, the opposite edge 150 thereof will finally be freed beyond skin sheet edge flange 37 with compression of the elastic strip means 46. The edge 150 of batten 248 will then be swung inward to seat into the channel 35 into which it will be snugly pushed by expansion of the compressed elastic strip means 46, as is indicated in FIG. 10. The companion vertical batten 348 is similar to batten 248 and it will be mounted in similar fashion in the remaining pair of opposed channels 35 and 134, as is indicated in FIG. 10.

It will be noted from FIGS. 7 and 10 that when the battens 48, 148, 248, and 348 are properly seated in the pairs of opposed channels 34, 35 and 35, 134, there is no such loose mounting of the side edges of the battens in the channels as to permit slope or appreciable transverse movement. In the seated positions of the battens the thickness thereof is substantially equal to the transverse widths of the mouths of the channels so as to provide such snug fitting. It will thus be seen that in both of the embodiments in FIGS. 4 to 7 incl. and FIGS. 9 and 10 the inner side of the channel of each opposed pair in which the compressible elastic strip means is seated and the back face of the side edge of the batten received in this channel constitute a pair of opposed faces with one of these faces being arranged obliquely to the other to facilitate swing of the other side edge of the batten into and out of alignment with the other channel opposed thereto. In the FIGS. 4 to 7 incl. embodiment the oblique face constitutes the inner side of the channel while in the FIGS. 9 and 10 embodiment the oblique face is formed on the back side of the batten.

When such a plurality of wall panels are employed for the construction of the outer wall of a building, it is desirable that junctures of parts of the coupling joint structures be calked to avoid ingress of moisture and cold or hot air. For example, as is suggested at 68, 68 in FIG. 10 strips of calking may be employed to seal the crack or corner recess at the meeting of the sheathing or skin sheet edges and the outside face 69 of the intervening batten.

The coupling joint structure at the corner 118 of the construction partly illustrated in FIG. 1 may, as is indicated in FIG. 11, be an L joint into which vertical side edges 119 and 120 of companion wall panels 15, 15 are connected together at right angles. As in the embodiment of FIGS. 9 and 10, the side edges 119 and 120 are defined by vertical rails 325 and 225, respectively, with each such rail provided with the paired channels 35 and 134. With the pair of wall panels 15, 15 arranged at right angles to each other, as is illustrated in FIG. 11, their side edges 119 and 120 are connected together on the outer sides thereof by an angle structure 70 which may consist of a vertical corner post 71 having rabbeted seats 72 and 73, and vertical batten strips 348 and 448 respectively having side edges 74 and 75 suitably seated in and anchored to these seats, such as by suitable waterproof adhesive supplemented, if desired, by positive conventional fastening elements (not shown). Vertical batten strips 348 has its other side edge 150 received in channel 35 defined in part by side edge vertical rail 225 and vertical batten strip 448 has its other side edge 249 seated in channel 134 defined in part by side edge vertical rail 325, with the compressible elastic strip means 46 seated in the latter channel to augment water-tight connection. Waterproofing may be provided in the form of strips of calking 68, 68 to seal the junctures of the vertical batten strips 348 and 448 with the edges of the sheathing sheets 22, 22 of the wall panels 15, 15. The other channels 134 and 35 of the vertical side rails 225 and 325 respectively receive the legs or flanges 76 and 77 of a right angle member 78, with the edge of flange 76 forced into the compressible elastic strip means 46 in channel 134, and, it will be understood that, if desired, additional filling and/or calking material may be employed in the juncture effected by angle member 78.

The right angle coupling joint illustrated in FIG. 11 may be provided with any suitable means securely to anchor the wall panel edge structures 119 and 120 together. Such means may be in the form of a plurality of staple-like fasteners 79 suitably spaced vertically, such as about twelve inches (12") apart, with their tangs or legs 80, 80 driven obliquely into the vertical side rails 225 and 325. It will be noted that the angle structure 70 effectively conceals the fasteners 79 and thus, of course, the latter will be first driven, and the covering angle will then be applied to fill out the corner. Certain springiness of the batten strips 348 and 448 may permit such subsequent assembly of this angle structure 70 or, initially, the corner post 71 may have only one of these batten strips fastened thereto with the other being anchored to it after the first batten strip and post have been located.

It will be understood that a T joint may be formed at the juncture of a wing or partition wall arranged at right angles to a main wall intermediate the ends of the latter, such as by combining proposals of the coupling joints of either FIGS. 4 to 7 incl. or FIGS. 9 and 10 with the coupling joint structure illustrated in FIG. 11. In such a T joint two of the channel members 78 may be employed to connect a side edge of a wall panel of the partition wall to opposed and aligned side edges of a pair of the wall panels in the main wall. Thus, such a T joint may employ two channel members of the type proposed at 78 in FIG. 11, a plurality of staple-like fasteners similar to that proposed at 79 to fasten opposite side edges of the partition wall panel to the main wall panel units, and a vertical batten strip which may be similar to that proposed at 48 in FIGS. 4 to 7 incl. or 248 in FIGS. 9 and 10, with the latter bridging across between the outer side edges of the aligned wall panel units in the main wall. It will also be understood that a joint may be provided at the meeting of four partition walls brought together at right angles to each other in cruciform arrangement with the employement of four angle members, such as those illustrated at 78 in FIG. 11, and with suitable means to hold the juxtaposed edges of the wall panels in the joint together.

As is indicated in FIG. 12, the bottom edge of a wall panel of the present invention may be modified for the purpose of improving either the structural characteristics or the appearance of the juncture of the bottoms of the wall panels with a floor area. For example, wall panel 115 may have the bottom rail 126 of its core or frame structure provided medially of its side edges with a longitudinally-extending bottom groove 81. The outer sheathing or skin sheet 122 may be extended below the bottom rail 126 to provide a depending portion 82 and a supplemental skin or sheathing sheet 83 may have its top edge 84 seated in the longitudinal groove 81 to depend from the bottom rail in substantial parallel relation to the depending portion 82 of outer sheathing or skin sheet 122. The bottom ends 85 and 86 respectively of the outer skin sheet depending portion 82, and the supplemental skin sheet 83 may be spaced apart and suitably connected together by a narrow supplemental bottom rail 87. The resulting structure provides an angular recess 88 into which may seat the top outside corner and side edge of floor slab 117, or a floor panel unit thereof when the latter is made up of a plurality of assembled panel units. With the depending portions 82 and 83 of the wall panel 115 lapping the outer side edge of the floor slab or panel unit 117, the latter is suitably finished off and concealed for improved appearance and covered as a protective measure. The bottom edge 89 of the depending portion of the outside wall panel unit 115 may be seated in substantial alignment with the bottom face 90 of the floor slab or floor panel unit 117 upon the top surface 91 of any suitable foundation beam structure 92. The juncture between these surfaces, such as at 93, may be covered in a concealing and protective manner by any suitable lateral batten strip 94.

It will be understood that modifications of the wall panels of the present invention will normally be provided in stocking the units for supply of all necessary structures to meet the demands of particular building designs. Such stock supply will include wall panels in which have been provided suitable door and window openings fitted with suitable door and window constructions. Of course, such wall panels of special design will have their marginal edges constructed similarly to the wall panels illustrated in the drawings and described herein so as to be interchangeable therewith and mountable and demountable in like manner. Also, the bottom edges of the wall panels of the present invention may be varied in form to adapt them to various types of weather sealing which one may wish to employ in the use of such panel units for outside wall constructions, the invention in no way being limited with respect to structural details of the base portions of the wall panels.

It will thus be seen that the objects set forth above, among those made apparent from the preceding description, are efficiently attained and, since certain changes may be made in the above constructions without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent is:

1. Companion building wall panels and coupling joint structure demountably connecting them together comprising, in combination; a pair of juxtaposed and interchangeably similar rectangular wall panels of unitary construction having appreciable thickness and a pair of vertical transversely-extending edges of appreciable width with one thereof opposed to a complementary transversely-extending vertical edge of the other in appreciably laterally-spaced relation, each of said opposed vertical edges of said juxtaposed panels having two longitudinally-extending channels formed therein facing toward the opposed complementary vertical edge of the other panel with the two channels in each panel edge being spaced appreciably transversely of the latter and with those in one panel edge being substantially aligned with those in the other panel edge to form two opposed pairs thereof, the opposed bottoms of the channels in each pair being laterally spaced apart a certain distance, each panel being of unitary construction having two outer laterally-extending facing zones in the form of a pair of outside sheathing sheets appreciably spaced apart transversely by interposed core means permanently fastened to said sheets with a side edge of said core means defining the channeled vertical edge and with opposed vertical edges of said sheathing sheets providing laterally-extending transversely-spaced side flanges, the inside face of each of said side flanges defining the outer side face of one of the two channels in the edge of said core means with said side flanges of one panel substantially aligned with and opposed to those of the other panel and spaced therefrom a lateral distance less than the spacing of the bottoms of the channels of each opposed pair thereof; a pair of resilient means with each seated in one channel of each opposed pair thereof; and a pair of elongated and relatively narrow, vertical stiff coupling battens each of unitary construction and a width greater than the lateral spacing between said opposed panel side flanges and the lateral spacing between the bottom of one of the channels of each opposed pair thereof and the resilient means seated in the other of this opposed pair of channels when the batten is absent but less than the lateral spacing of the bottoms of each opposed pair of said channels with each stiff batten having its side edges received in an opposed pair of said channels behind the adjacent pair of opposed side flanges with said battens extending laterally in planes generally parallel to the planes of said laterally-extending outside sheathing sheets, one side edge of each batten being abutted against said resilient means in one of each of the opposed pair of channels with the resilient means being held in distorted condition thereby forcing the other side edge of this batten to snug seating against the bottom of the other of this opposed pair of channels, the inner side face of the channel of each opposed pair in which said resilient means is seated and the back face of the side edge of said stiff batten received in this channel constituting a pair of opposed faces with one thereof being arranged obliquely to the other to facilitate swing of the other side of said batten into and out of alignment with the other channel opposed thereto, each stiff batten being removable by forcing its abutted side edge back laterally against the resilient means associated therewith to further distortion of the latter until the opposite side edge of this batten is withdrawn from the channel in which it is seated and freed from behind the adjacent side flange for outward swing permitting lateral withdrawal of the other side edge.

2. The companion wall panels and coupling join structure as defined in claim 1 characterized by the inner side face of each of the channels in which one of said resilient means is seated being arranged obliquely to the outer side face thereof which is defined by the adjacent side facing flange, whereby the bottom of this channel is wider than the mouth thereof permitting the swing of each of said battens.

3. The companion wall panels and coupling joint structure as defined in claim 1 characterized by the inner side face of the side edge of each batten which is inserted in each resilient means-carrying channel being arranged obliquely to its outer side face to form a tapered side edge permitting the swing of each of said battens.

4. The companion wall panels and coupling joint structure as defined in claim 1 characterized by said pair of panels being like and symmetrically formed with each of said panels having both of its side edges provided with like vertical batten-receiving channels, the resilient means-carrying channel in one side edge being located adjacent one of its two outer facing zones and that in its other side edge being located adjacent its other outer facing zone, permitting coupling of either side edge to that of the adjacent like panel.

5. In a building construction a concealed top joint structure between an overhead horizontal loading structure, such as a ceiling, and the top edge of an upwardly-extending sidewall panel having a load-bearing core means intervening a pair of transversely-spaced outer facing sheets secured to the latter and with the sheets having lateral top edges spaced appreciably below the overhead loading structure, the combination comprising means defining a laterally-extending top end of said core means provided on its upper side with at least one laterally-extending oblique wedging surface sloping upwardly from a side edge of said panel with the top edges of the two outer facing sheets on opposite sides of said core means top end extending upwardly beyond said wedging surface in the form of a pair of upwardly-extending transversely-spaced top flanges and with each top edge arranged substantially horizontal, the top end of each of said outer facing sheets lapping against an adjacent side of the top end of said core means and extending obliquely downward and transversely-inward toward the latter together to define a horizontal top groove extending laterally of the top end of said panel; panel wedge means driven in laterally from the side edge of said panel between said wedging surface and the overhead horizontal loading structure, said wedge means having a portion located between said top flanges and locking the top end of said panel to said overhead loading structure; and a pair of transversely-spaced horizontal masking batten means each wedged in between one of said facing sheet top edges and the overhead loading structure with its bottom edge being wedge-shaped to fit into the horizontal top groove thereat, the top edge of each of said horizontal masking batten means including a marginal zone of compressible elastic material to perform wedging action for holding the batten means in position while permitting ready removal thereof with said pair of batten means concealing said panel wedge means on opposite sides.

References Cited in the file of this patent
UNITED STATES PATENTS

| | | |
|---|---|---|
| 2,066,718 | Dietz | Jan. 5, 1937 |
| 2,076,388 | Venzie | Apr. 6, 1937 |
| 2,094,265 | Curren | Sept. 28, 1937 |
| 2,107,624 | Berger | Feb. 8, 1938 |
| 2,258,973 | Cross | Oct. 14, 1941 |
| 2,297,056 | Gunnison | Sept. 29, 1942 |
| 2,300,937 | Lahti | Nov. 3, 1942 |
| 2,629,467 | Fry | Feb. 24, 1953 |
| 2,694,840 | Smith | Nov. 23, 1954 |
| 2,748,592 | Kelly | June 5, 1956 |
| 2,849,758 | Plumley et al. | Sept. 2, 1958 |
| 2,877,875 | Bolt | Mar. 17, 1959 |